United States Patent
Allu Balan et al.

(10) Patent No.: US 12,495,335 B2
(45) Date of Patent: Dec. 9, 2025

(54) SELECTIVE ROUTING CONTROL FOR CIRCUIT SWITCHED FALLBACK

(71) Applicant: T-Mobile USA, Inc., Bellevue, WA (US)

(72) Inventors: Harikishore Allu Balan, Lynnwood, WA (US); Saqib Badar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 427 days.

(21) Appl. No.: 18/069,086

(22) Filed: Dec. 20, 2022

(65) Prior Publication Data

US 2024/0205753 A1   Jun. 20, 2024

(51) Int. Cl.
| | |
|---|---|
| H04W 36/00 | (2009.01) |
| H04W 8/04 | (2009.01) |
| H04W 8/06 | (2009.01) |
| H04W 40/20 | (2009.01) |

(52) U.S. Cl.
CPC ......... *H04W 36/0022* (2013.01); *H04W 8/04* (2013.01); *H04W 8/06* (2013.01); *H04W 40/20* (2013.01)

(58) Field of Classification Search
CPC ..... H04W 8/04; H04W 8/06; H04W 36/0022; H04W 40/20
See application file for complete search history.

(56) References Cited

U.S. PATENT DOCUMENTS

| | | |
|---|---|---|
| 6,134,316 A | 10/2000 | Kallioniemi et al. |
| 6,311,055 B1 | 10/2001 | Boltz |
| 6,469,998 B1 | 10/2002 | Burgaleta et al. |
| 6,795,444 B1 | 9/2004 | Vo et al. |
| 6,839,421 B2 | 1/2005 | Ferraro et al. |
| 6,888,803 B1 | 5/2005 | Gentry et al. |
| 6,909,776 B2 | 6/2005 | Holt et al. |
| 7,054,307 B2 | 5/2006 | Papadimitriou et al. |
| 7,499,704 B1 | 3/2009 | Bonner |
| 7,555,555 B2 | 6/2009 | Park et al. |
| 7,860,498 B2 | 12/2010 | Lovell et al. |
| 7,920,529 B1 | 4/2011 | Mahler et al. |

(Continued)

FOREIGN PATENT DOCUMENTS

| | | |
|---|---|---|
| CN | 101237635 B | 5/2012 |
| CN | 101374336 B | 4/2013 |

(Continued)

*Primary Examiner* — Melanie Jagannathan
(74) *Attorney, Agent, or Firm* — Perkins Coie LLP (57) ABSTRACT

Systems, methods, and devices that relate to staged discontinuation of the circuit-switched fallback are disclosed. In one example aspect, a method for wireless communication includes receiving, by a network server configured to manage subscriber data, a request from a telephony application server requesting a routing of a call or a message for a mobile subscriber and transmitting, by the network server to the telephony application server, a response indicating that the packet-switched network is not available for routing the call or the message. The response comprises a value that identifies the location of the mobile subscriber to enable the telephony application server to refrain from transmitting a subsequent request requesting the routing of the call or the message using the circuit-switched network.

20 Claims, 7 Drawing Sheets

(56) References Cited

U.S. PATENT DOCUMENTS

| | | | |
|---|---|---|---|
| 8,078,166 B2 | 12/2011 | Thiebaut et al. | |
| 8,086,254 B2 | 12/2011 | Silver et al. | |
| 8,144,696 B2 | 3/2012 | Kallio et al. | |
| 8,175,236 B2 | 5/2012 | Pandey et al. | |
| 8,228,891 B2 | 7/2012 | Bertagnole et al. | |
| 8,442,526 B1 | 5/2013 | Bertz et al. | |
| 8,547,969 B2 | 10/2013 | Watfa et al. | |
| 8,654,703 B2 | 2/2014 | Stewart | |
| 8,761,764 B2 | 6/2014 | Mccann et al. | |
| 8,874,120 B1* | 10/2014 | Tian | H04W 8/12 455/433 |
| 9,444,854 B2 | 9/2016 | Piscopo | |
| 9,635,526 B2 | 4/2017 | Mccann | |
| 9,667,798 B2 | 5/2017 | Witzel | |
| 9,794,769 B2 | 10/2017 | Dubesset et al. | |
| 10,117,291 B2 | 10/2018 | Snyder et al. | |
| 10,484,933 B2 | 11/2019 | Bremer | |
| 10,931,668 B2 | 2/2021 | Mehta | |
| 11,412,430 B2* | 8/2022 | Chong | H04W 28/0865 |
| 2006/0077956 A1 | 4/2006 | Saksena et al. | |
| 2007/0197227 A1 | 8/2007 | Naqvi et al. | |
| 2008/0039104 A1 | 2/2008 | Gu et al. | |
| 2008/0268809 A1 | 10/2008 | Busin et al. | |
| 2009/0129371 A1 | 5/2009 | Bishay | |
| 2009/0131086 A1* | 5/2009 | Osborn | H04M 7/009 455/466 |
| 2010/0105379 A1 | 4/2010 | Bonner et al. | |
| 2010/0232417 A1 | 9/2010 | Segre | |
| 2010/0329243 A1* | 12/2010 | Buckley | H04L 65/80 370/352 |
| 2011/0090848 A1* | 4/2011 | Kim | H04W 60/00 370/328 |
| 2011/0207458 A1* | 8/2011 | Tanaka | H04W 8/12 455/437 |
| 2012/0106324 A1* | 5/2012 | Keller | H04W 48/18 370/225 |
| 2012/0142341 A1* | 6/2012 | Nagpal | H04W 48/18 455/426.1 |
| 2013/0171974 A1 | 7/2013 | Bae | |
| 2013/0286936 A1* | 10/2013 | Sen | H04W 64/006 370/328 |
| 2013/0309991 A1* | 11/2013 | Shaw | H04W 76/36 370/328 |
| 2013/0329647 A1* | 12/2013 | Keller | H04W 8/04 370/328 |
| 2014/0073333 A1* | 3/2014 | Keller | H04W 40/02 455/445 |
| 2014/0307706 A1* | 10/2014 | Keller | H04W 36/0022 370/331 |
| 2015/0056986 A1* | 2/2015 | Kim | H04L 65/1073 455/432.1 |
| 2016/0057607 A1* | 2/2016 | Dubesset | H04W 8/04 455/433 |
| 2016/0065747 A1* | 3/2016 | Haspekian | H04L 61/4511 370/352 |
| 2016/0150497 A1* | 5/2016 | Janosi | H04L 65/1073 455/435.1 |
| 2016/0165432 A1* | 6/2016 | Dubesset | H04W 76/12 455/433 |
| 2016/0278132 A1* | 9/2016 | Baek | H04W 76/00 |
| 2017/0257784 A1* | 9/2017 | Ni | H04W 36/00224 |
| 2017/0339539 A1* | 11/2017 | Guo | H04L 65/1016 |
| 2018/0035335 A1* | 2/2018 | Wallis | H04L 65/1016 |
| 2019/0098547 A1* | 3/2019 | Chong | H04W 36/1443 |
| 2019/0124124 A1* | 4/2019 | Chong | H04L 65/1073 |
| 2019/0174003 A1* | 6/2019 | Chandramouli | H04W 48/20 |
| 2020/0252849 A1* | 8/2020 | Tang | H04W 36/1443 |
| 2021/0314369 A1* | 10/2021 | Lee | H04L 65/1073 |

FOREIGN PATENT DOCUMENTS

| | | |
|---|---|---|
| CN | 108718442 B | 1/2022 |
| CN | 108882220 B | 5/2022 |
| WO | 0156262 A1 | 8/2001 |

* cited by examiner

SELECTIVE ROUTING CONTROL FOR CIRCUIT SWITCHED FALLBACK

BACKGROUND

A circuit-switched network relies on a physical connection between two nodes. In contrast, packet switching is a means of organizing and sharing data into bits called packets, which are then transmitted across a digital network. Communication technology has evolved over time to enable data to be transferred from one location or device to another through packet switching.

BRIEF DESCRIPTION OF THE DRAWINGS

Detailed descriptions of implementations of the present technology will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Circuit switching is a type of network configuration in which a physical path is dedicated to a single connection between two endpoints in the network for the duration of a dedicated connection. In contrast, packet switching is defined as the connectionless network where messages are divided and grouped together as blocks of data known as packets that are transmitted across a network. Currently, circuit-switched (CS) networks and packet-switched (PS) networks co-exist.

With the advancement of wireless technology, standalone attachments to packet-switched networks (e.g., the Long-Term Evolution (LTE) networks or the Fifth Generation (5G) networks) can be provided to user devices without offering any underlying CS coverage. To enable discontinuation of the circuit-switched in a staged manner, techniques are disclosed herein to enable network nodes in the core network to keep track of location information of the parts of the network in which CS support has been obsolete (or deprecated). The core network then determines, when PS routing is unavailable for a particular user device in a particular location, whether initiating a CS retry attempt for a call or a message of the user device is necessary, thereby reducing or eliminating of signaling overhead associated with the unnecessary CS retry attempts.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
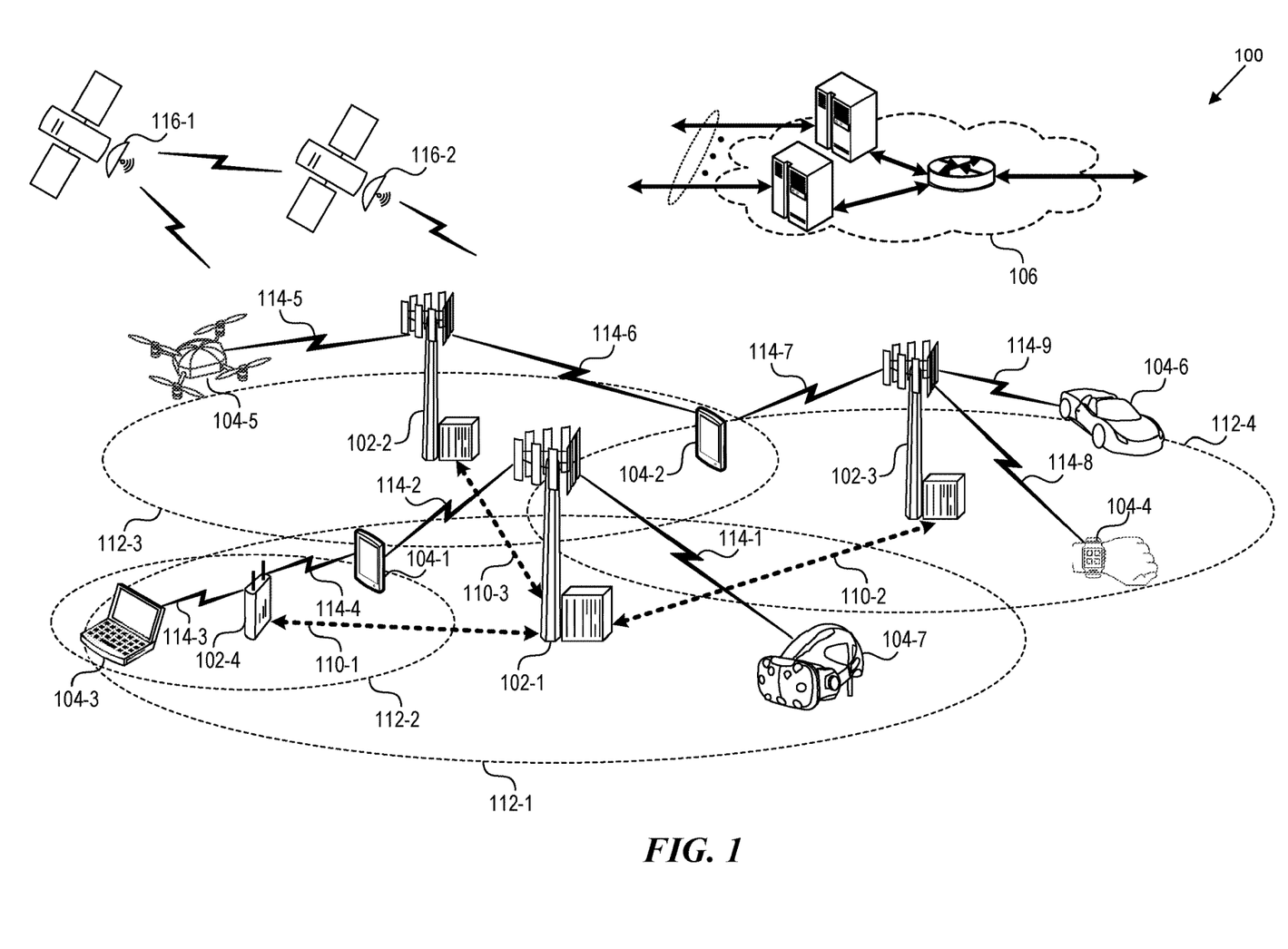
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Staged Phase-out of Circuit Switched Fallback (CSFB)

Figure 2:
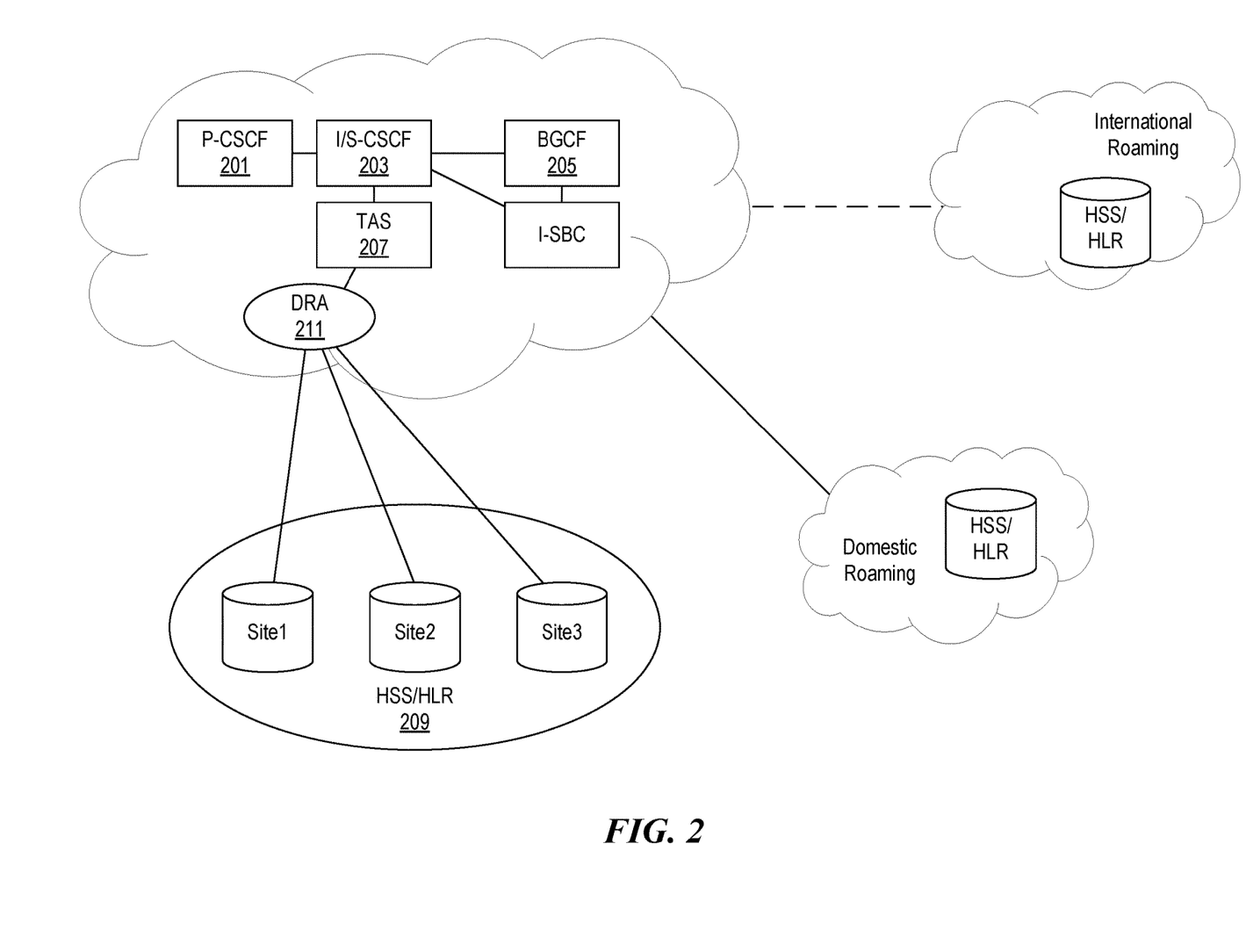
FIG. 2 illustrates an example architecture of an Internet Protocol Multimedia Subsystem (IMS) network.

Historically, mobile phones have provided voice call services to users over a circuit-switched-style network, such as the public switched telephone network (PSTN), rather than over an IP packet-switched network. To enable delivery of IP multimedia services, the IP Multimedia Subsystem or IP Multimedia Core Network Subsystem (IMS) has been introduced as an architectural framework, which uses the Session Initiation Protocol (SIP) to initiate, maintain, and terminate real-time sessions that include voice, video and messaging applications. The SIP is used for signaling and controlling multimedia communication sessions in applications of Internet telephony for voice and video calls, in private IP telephone systems, in instant messaging over IP networks as well as voice calling over Long-Term Evolution (VOLTE) or New Radio (VONR). FIG. 2 illustrates an example architecture of an IMS network. Some of the network functions provided by the IMS include:

1. Call Session Control Function (CSCF).
    1a. A Proxy-CSCF (P-CSCF) 201 is a SIP proxy that is the first point of contact for the IMS terminal.
    1b. An Interrogating-CSCF (I-CSCF) or a Serving-CSCF (S-CSCF) 203 is another SIP function located of an administrative domain. Its IP address is published in the Domain Name System (DNS) of the domain so that remote servers can find it, and use it as a forwarding point (e.g., registering) for SIP packets to this domain.
2. A Breakout Gateway Control Function (BGCF).
    The BGCF 205 is a SIP proxy that processes requests for routing from a I/S-CSCF 203 when it has determined that the session cannot be routed using DNS or Electronic Numbering (ENUM) lookups (ENUM)/DNS. It includes routing functionality based on telephone numbers.
3. Telephony Application Server (TAS).
    The TAS 207 is a component used in the core network of a network operator to provide telephony applications and additional multimedia functions.
4. A Home Subscriber Server (HSS)/Home Location Register (HLR).
    The HSS/HLR 209 is a centralized database of subscriber information that allows Communications Service Providers (CSPs) to manage customers in real-time and in a cost-effective manner. The HSS/HLR can be in connection with the TAS via the Diameter Routing Agent (DRA) 211.

Voice over IP (VOIP), also called IP telephony, is a method and group of technologies for the delivery of voice communications and multimedia sessions over packet-switched networks. VoIP is the long-term goal for the delivery of voice services on cellular networks. However, before VoIP technology completely matures, when an LTE or 5G device is used to make or receive a voice call or a message, the device "falls back" to the 3G or 2G network to complete the call or to deliver the message using the circuit-switched networks. This fallback is referred to as Circuit Switched Fallback (CSFB) and is seen as an interim solution for network operators.

Currently, legacy 2G/3G networks and the LTE/5G network co-exist within mixed networks. Within such mixed networks, the Terminating Access Domain Selection (T-ADS) is a component that determines whether a call or a message should be delivered over the CS or the PS network. When the T-ADS determines that there is no PS support, the TAS checks for the CS Domain Routing Number (CSRN) to deliver the call or the message as part of the CS retry mechanism.

As VoIP technologies mature, the 2G or 3G networks, or the use of the CS network, can be slowly phased out by the network operators. An increasing number of user devices can perform standalone attachments to mobile networks using 4G/5G technology without any underlying CS coverage. In those cases, support for CSFB becomes deprecated for at least parts of the network, and the consistent checking of the CSRN can lead to unnecessary signaling overhead and waste of network resources. A complete switch of the T-ADS routing mode from the CSFB mode to PS only mode, however, can cause network disturbance, as the CS support may be slowly phased out in different parts of the networks.

This disclosure includes techniques that can be implemented in various embodiments to reduce or eliminate unnecessary CS retry attempts when CS support is gradually discontinued in various parts of the networks. In some embodiments, network nodes in the core network can keep track of the progress of the phase-out of the CSFB by keeping records of locational information of the parts of the network in which CS support has been deprecated. The core network is then able to determine, for a particular user device in a particular location, whether initiating a CA retry attempt for a call or a message is necessary.

Figure 3:
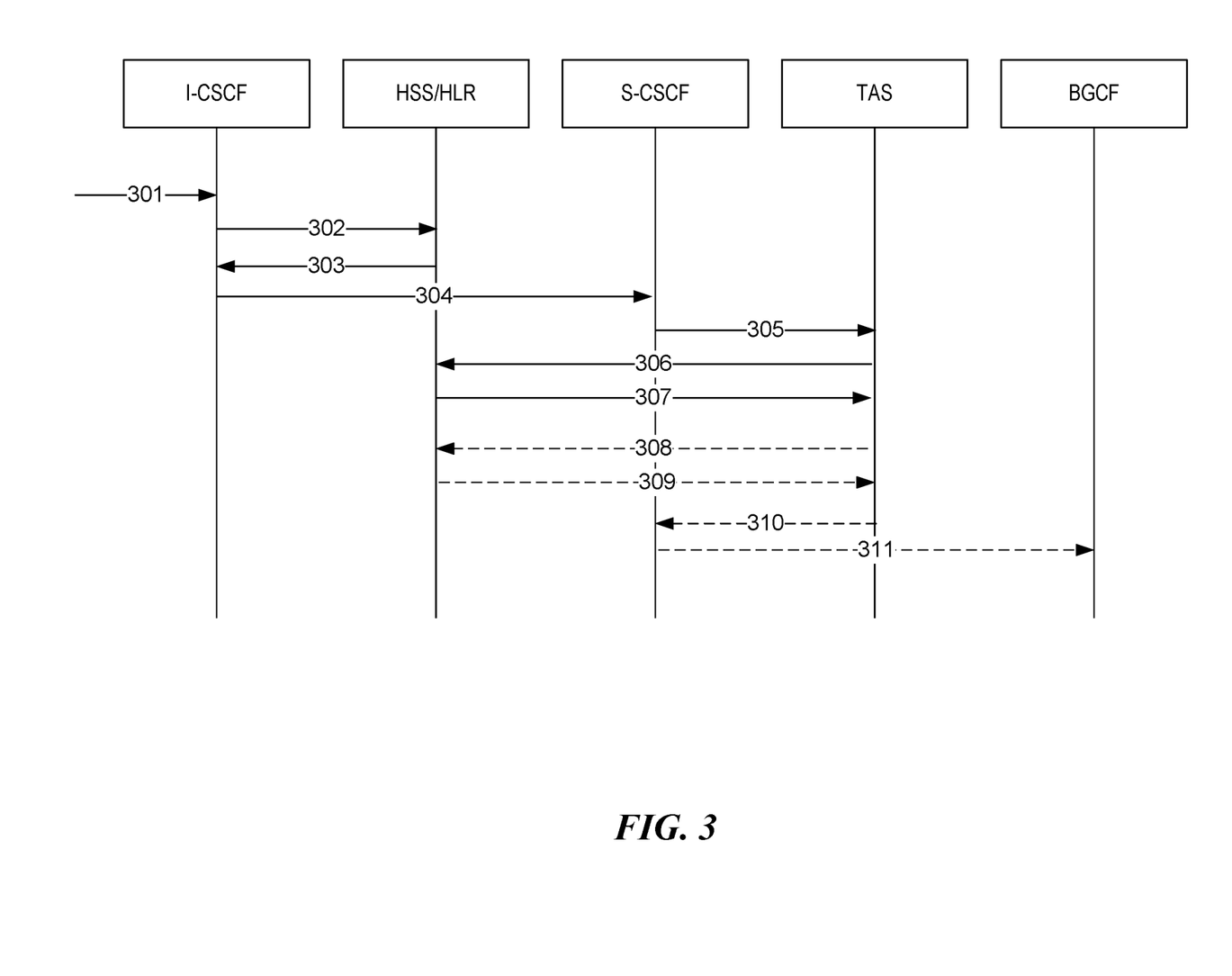
FIG. 3 is a sequence chart of an example circuit-switched (CS) retry call flow in accordance with one or more embodiments of the present technology.

FIG. 3 is a sequence chart of an example CS retry call flow in accordance with one or more embodiments of the present technology. The example call flow includes the following operations:

Operation 301: The I-CSCF receives an SIP INVITE message for a call or a message.

Operation 302: The I-CSCF transmits a Location-Info-Request (LIR) message to the HSS/HLR. In some embodiments, the LIR includes the Public-User-Identity Attribute-Value Pair (AVP).

Operation 303: The HSS/HLR returns a Location-Info-Answer (LIA) message to the I-CSCF. The LIA message includes the assigned S-CSCF in the Server Name AVP.

Operation 304: The I-CSCF forwards the SIP INVITE message to the assigned S-CSCF.

Operation 305: The S-CSCF transmits a message (e.g., a SIP INVITE message) to the TAS.

Operation 306: The TAS transmits a User-Data-Request (UDR) message to the HSS/HLR. For registered users, this message can also be Subscribe-Notifications-Request (SNR). The message can request Terminating Access Domain Selection (T-ADS) information with respect to whether the call or the message should be delivered over the CS or PS network. The TAS also requests Visitor Location Register (VLR) information, such as the VLR address, for determining the CS retry logic. The VLR is a database that contains information about the subscribers within a location area of a mobile switching center (MSC).

Operation 307: The HSS/HLR sends a User-Data-Answer (UDA) message to the TAS. The UDA includes requested T-ADS information indicating whether the call should be routed over the PS networks. When routing over the PS network is not feasible, the T-ADS information can include VLR information of the subscriber device. Once the TAS obtains the VLR information about the subscriber device, it can determine whether the VLR value corresponds to a legacy MSC that has been deprecated. In some embodiments, the TAS can keep of table of one or more VLR value ranges. If the VLR value of the subscriber device falls within the one or more ranges, the TAS can determine that CS network support has been phased out for the subscriber device and refrain from initiating an CS retry attempt.

Operation 308 (optional): If the VLR value of the subscriber device is outside of the one or more ranges, indicating that the subscriber device still has underlying CS coverage, the TAS transmits another UDR to the HSS/HLR to request the CSRN of the subscriber device.

Operation 309 (optional): The HSS/HLR then responds with another UDA message that includes the CSRN of the subscriber device.

Operation 310 (optional): The TAS can initiate the CS retry attempt by sending an SIP INVITE to the S-CSCF based on the CSRN number.

Operation 311 (optional): The S-CSCF forwards the SIP INVITE to the CS networks (e.g., 3G networks) to complete the CS retry attempt.

Figure 4:
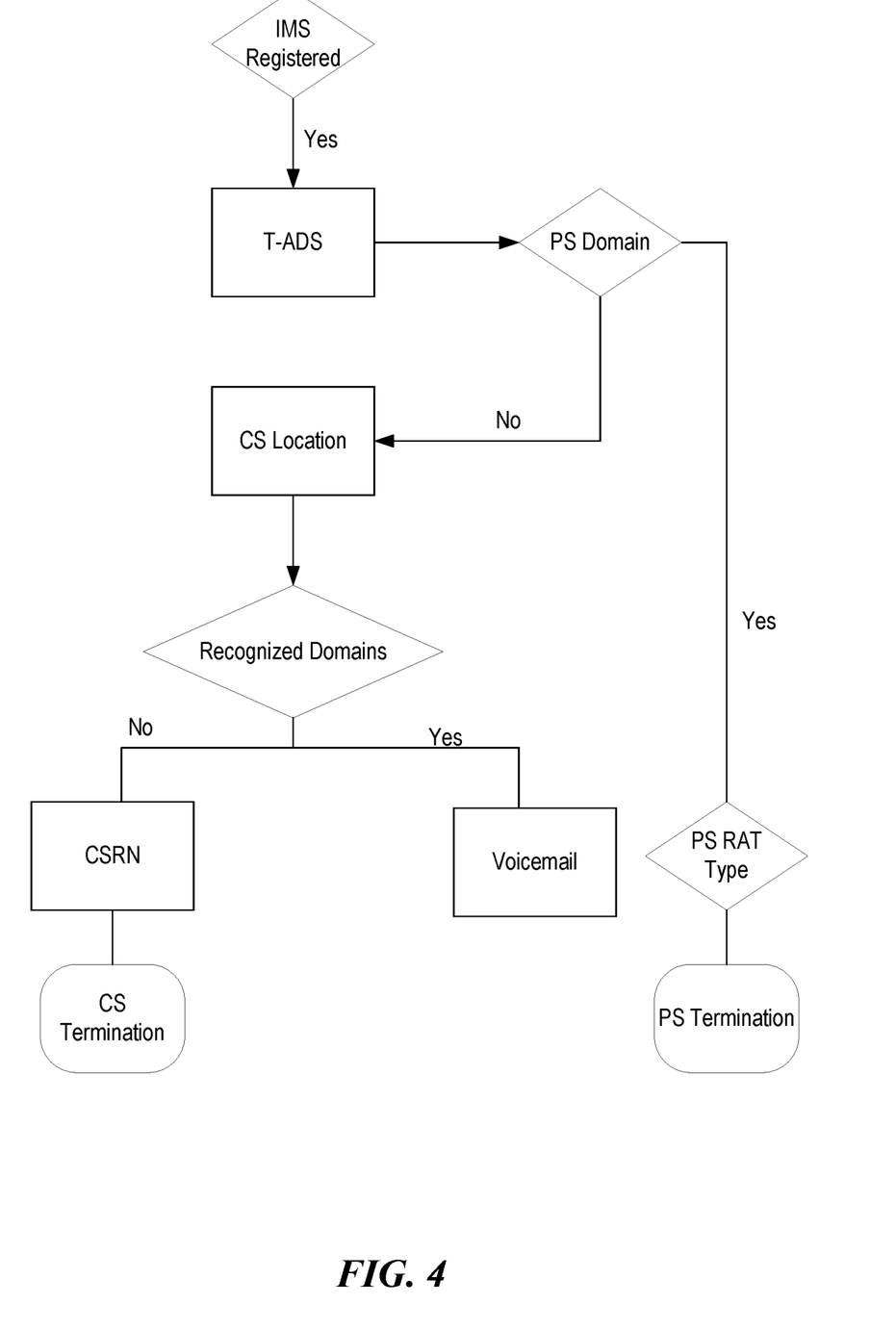
FIG. 4 is a flow diagram of an example CS retry selection in accordance with one or more embodiments of the present technology.

FIG. 4 is a flow diagram of an example CS retry selection in accordance with one or more embodiments of the present technology. If a call is from an IMS registered subscriber, the T-ADS determines if the call should be routed in the PS domain or CS domain. If PS domain routing is supported, the Radio Access Technology (RAT) type in the PS domain can be selected. If the call should be routed in the CS domain, the CS location of the subscriber device (e.g., the MSC location) is checked, e.g., by the TAS, to determine whether the subscriber device is located in one of the recognized domains in which CS support has been phased out. If so, the call can be directed to voicemail without initiating an attempt for a CS retry. If the CS location is outside of the recognized domains, a CS retry attempt can be initiated using the CSRN value. The subscriber device can be within its home network or a roaming device within a visited network.

In some embodiments, the recognized domains are tracked using a database or a look-up table. In some embodiments, the VLR value is the same as a MSC number that includes a country code (CC) specifying the code of the country where an MSC is located, a National Destination Code (NDC) that is a Public Land Mobile Network (PLMN) number, and a locally significant part (LSP) allocated by network operators. The recognized domains can be represented by one or more country codes, one or more NDCs, and/or one or more ranges of values (e.g., CC, NDC, and/or LSP values). The VLR value indicating the MSC location of the subscriber device can be compared against the values in the database and/or the look-up table to determine whether the CS support has been phased out in that MSC location.

Figure 5:
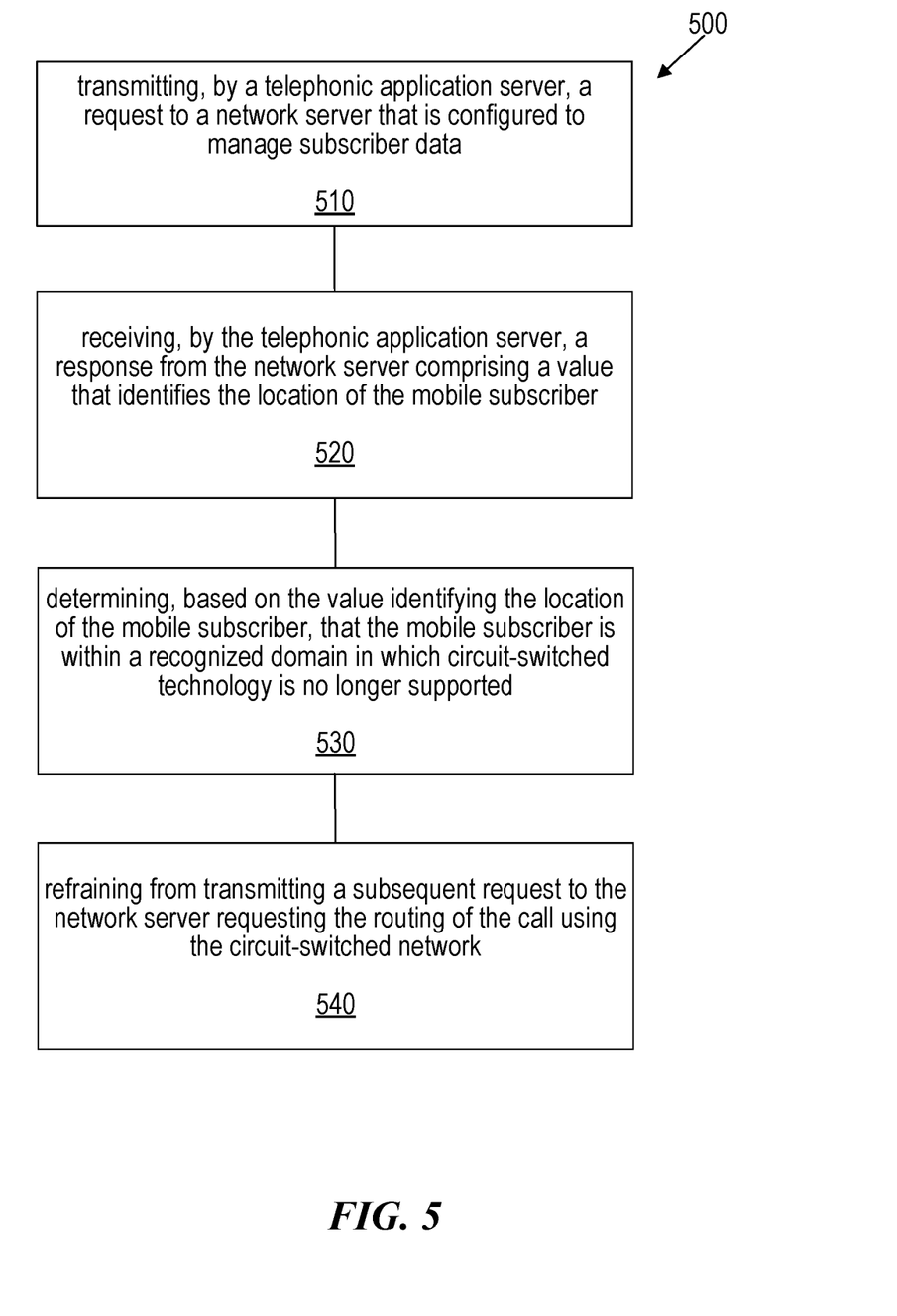
FIG. 5 is a flowchart representation of a process or a method for wireless communication in accordance with one or more embodiments of the present technology.

FIG. 5 is a flowchart representation of a process or a method for wireless communication in accordance with one or more embodiments of the present technology. The process 500 include, at operation 510, transmitting, by a telephony application server, a request to a network server that is configured to manage subscriber data. The request requests a routing of a call or a message for a mobile subscriber using either a packet-switched network or a circuit-switched network. The request further requests a location of the mobile subscriber. The process 500 includes, at operation 520, receiving, by the telephony application server, a response from the network server. The response indicates that the packet-switched network is not available for routing the call. The response further comprises a value that identifies the location of the mobile subscriber. The process 500 includes, at operation 530, determining, by the telephony application server based on the value identifying the location of the mobile subscriber, that the mobile subscriber is within a recognized domain in which circuit-switched technology is no longer supported. The process 500 also includes, at operation 540, refraining from transmitting a subsequent request to the network server requesting the routing of the call using the circuit-switched network.

Figure 6:
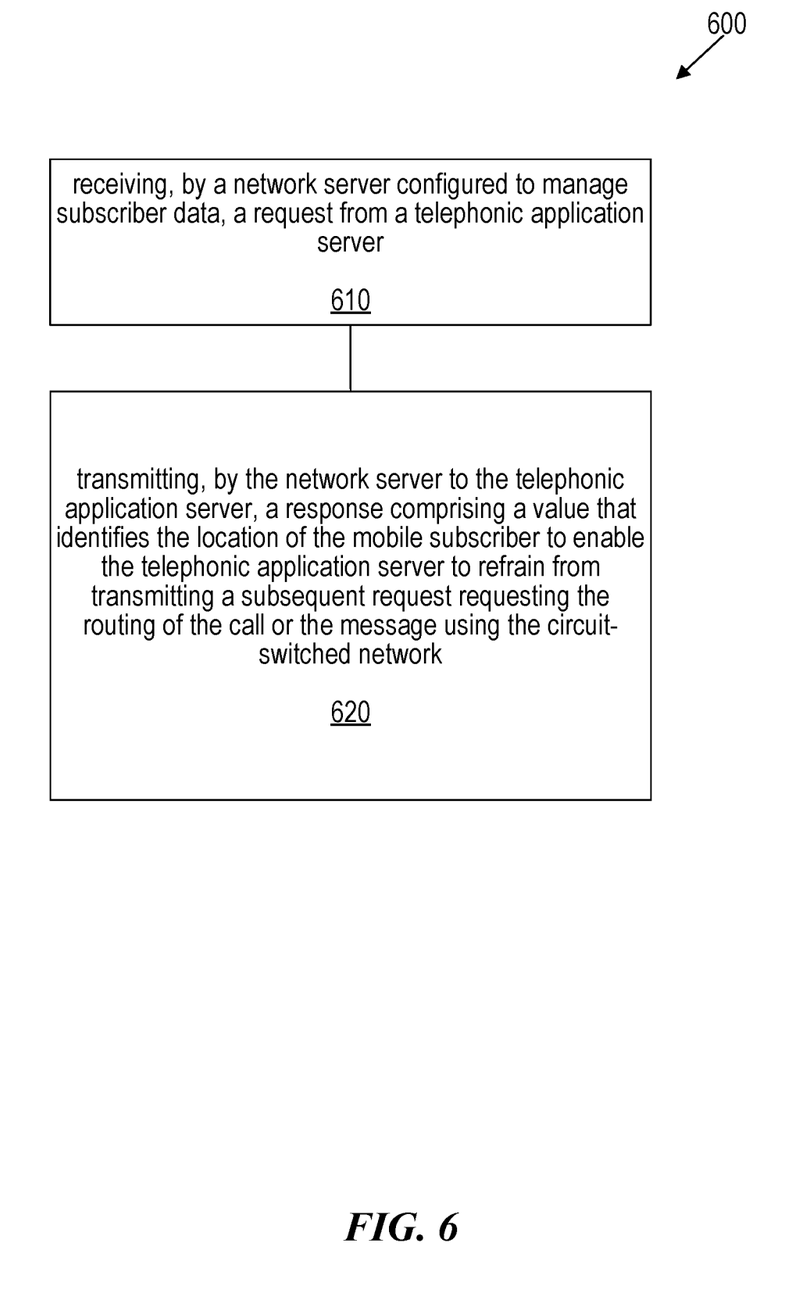
FIG. 6 is a flowchart representation of a method for wireless communication in accordance with one or more embodiments of the present technology.

FIG. 6 is a flowchart representation of a process or a method for wireless communication in accordance with one or more embodiments of the present technology. The process 600 includes, at operation 610, receiving, by a network server configured to manage subscriber data, a request from a telephony application server. The request requests a routing of a call or a message for a mobile subscriber using either a packet-switched network or a circuit-switched network. The request further requests a location of the mobile subscriber. The process 600 includes, at operation 620, transmitting, by the network server to the telephony application server, a response indicating that the packet-switched network is not available for routing the call. The response comprises a value that identifies the location of the mobile subscriber to enable the telephony application server to refrain from transmitting a subsequent request requesting the routing of the call or the message using the circuit-switched network in case the mobile subscriber is within a recognized domain in which circuit-switched technology is no longer supported.

Computer System

Figure 7:
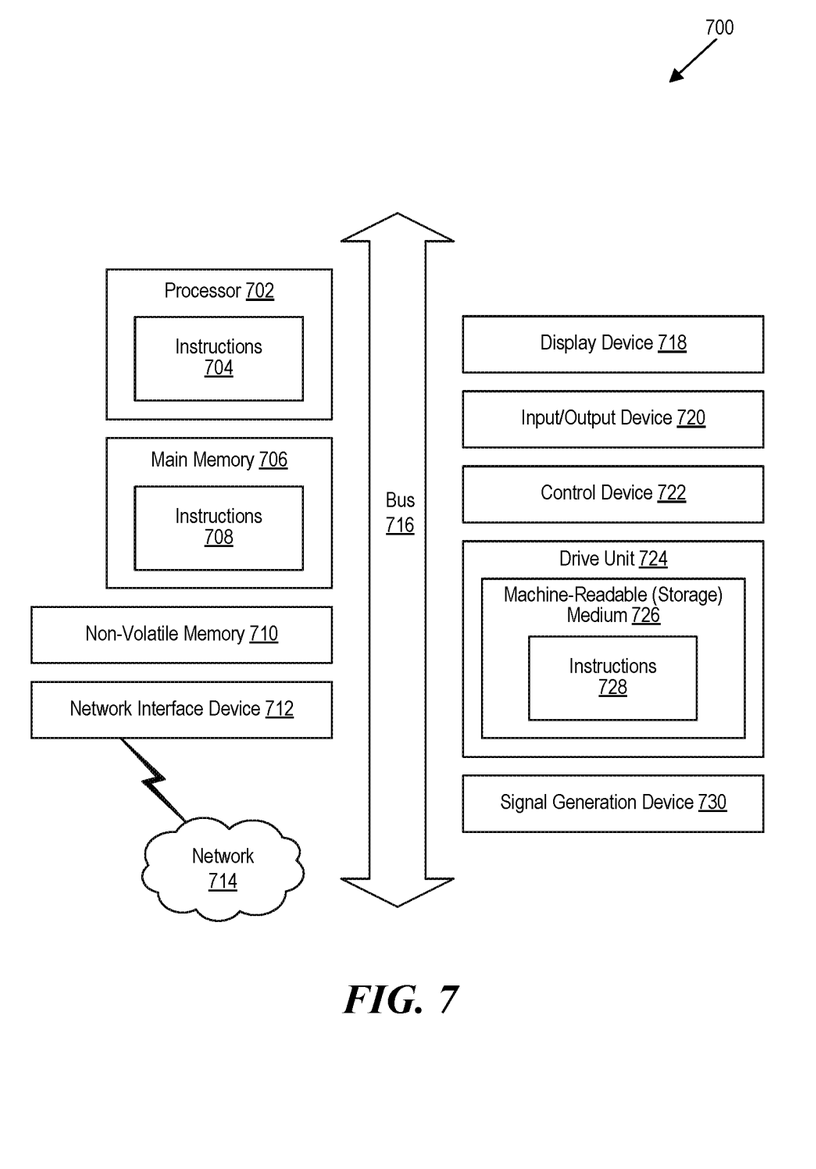
FIG. 7 is a block diagram that illustrates components of a computing device.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A system for wireless communication, the system comprising:
   a network server that is configured to manage subscriber data; and
   a telephony application server that is configured to:
      store a range of values indicating one or more recognized domains in which circuit-switched technology is no longer supported;
      transmit a request to the network server requesting a routing of a call or a message for a mobile subscriber using either a packet-switched network or a circuit-switched network,
         wherein the request further requests a location of the mobile subscriber;
   wherein the network server is configured to:
      transmit, in response to the request, a response indicating that the packet-switched network is not available for routing the call or the message,
         wherein the response comprises a value that identifies the location of the mobile subscriber, and
   wherein the telephony application server is further configured to:
      compare the value identifying the location of the mobile subscriber against the range of values to determine that the mobile subscriber is within one of the one or more recognized domains;
      determine, based on the value, that the mobile subscriber is within a recognized domain in which circuit-switched technology is no longer supported; and
      refrain from transmitting a subsequent request to the network server requesting the routing of the call or the message using the circuit-switched network.

2. The system of claim 1, wherein the one or more recognized domains are represented using one or more mobile switching center locations.

3. The system of claim 1, wherein the telephony application server is further configured to:
   determine that a second mobile subscriber is outside the one or more recognized domains in which the circuit-switched technology is no longer supported; and
   initiate a circuit-switched retry attempt using a Circuit-Switched Domain Routing Number (CSRN) of the mobile subscriber.

4. The system of claim 1, wherein the value that identifies the location of the mobile subscriber comprises a Virtual Location Register (VLR) number.

5. The system of claim 1, wherein the telephony application server is configured to direct the call to voicemail upon determining that the mobile subscriber is within the recognized domain in which circuit-switched technology is no longer supported.

6. The system of claim 1, wherein the mobile subscriber is in a home network.

7. The system of claim 1, wherein the mobile subscriber is a roaming device, and wherein the call or the message is initiated from a network that is different than a home network of the mobile subscriber.

8. The system of claim 1, wherein the network server is a Home Subscriber Server (HSS) or a Home Location Register (HLR).

9. The system of claim 1, wherein the network server is configured to:
   transmit a second response indicating that the packet-switched network is available for routing a second call or a second message; and
   select a Radio Access Technology (RAT) type for delivering the call or the message using the packet-switched network.

10. A method for wireless communication, the method comprising:
    transmitting, by a telephony application server, a request to a network server that is configured to manage subscriber data,
       wherein the request requests a routing of a call or a message for a mobile subscriber using either a packet-switched network or a circuit-switched network,
       wherein the request further requests a location of the mobile subscriber;
    receiving, by the telephony application server, a response from the network server,
       wherein the response indicates that the packet-switched network is not available for routing the call or the message,
       wherein the response further comprises a value that identifies the location of the mobile subscriber;
    comparing, by the telephony application server, the value against values that indicate information about subscribers roaming within one or more location areas;
    determining, by the telephony application server based on the value identifying the location of the mobile subscriber, that the mobile subscriber is within a recognized domain in which circuit-switched technology is no longer supported; and
    refraining from transmitting a subsequent request to the network server requesting the routing of the call or the message using the circuit-switched network.

11. The method of claim 10, wherein the value that identifies the location of the mobile subscriber comprises a Virtual Location Register (VLR) number.

12. The method of claim 10, wherein the value that identifies the location of the mobile subscriber comprises a country code (CC), a National Destination Code (NDC), and a locally significant part (LSP) allocated by a network operator.

13. The method of claim 10, wherein the mobile subscriber is in a home network or a visited network.

14. The method of claim 10, wherein the network server is a Home Subscriber Server (HSS) or a Home Location Register (HLR).

15. A method for wireless communication, comprising:
receiving, by a network server configured to manage subscriber data, a request from a telephony application server,
wherein the request requests a routing of a call or a message for a mobile subscriber using either a packet-switched network or a circuit-switched network,
wherein the request further requests a location of the mobile subscriber; and
transmitting, by the network server to the telephony application server, a response indicating that the packet-switched network is not available for routing the call or the message,
wherein the response comprises a value that identifies the location of the mobile subscriber to enable the telephony application server to refrain from transmitting a subsequent request requesting the routing of the call or the message using the circuit-switched network in case the mobile subscriber is within a recognized domain in which circuit-switched technology is no longer supported, and
wherein the recognized domain is represented using a mobile switching center location.

16. The method of claim 15, wherein the value that identifies the location of the mobile subscriber comprises a Virtual Location Register (VLR) number.

17. The method of claim 15, wherein the value that identifies the location of the mobile subscriber comprises a country code (CC), a National Destination Code (NDC), and a locally significant part (LSP) allocated by a network operator.

18. The method of claim 15, wherein the network server is a Home Subscriber Server (HSS) or a Home Location Register (HLR).

19. The method of claim 15, wherein the mobile subscriber is in a home network.

20. The method of claim 15, wherein the mobile subscriber is a roaming device, and wherein the call or the message is initiated from a network that is different than a home network of the mobile subscriber.

* * * * *